Sept. 27, 1966    K. M. ALLEN ETAL    3,275,136
APPARATUS FOR DETECTING SEEDS IN FRUIT
Filed Oct. 9, 1964    2 Sheets-Sheet 1
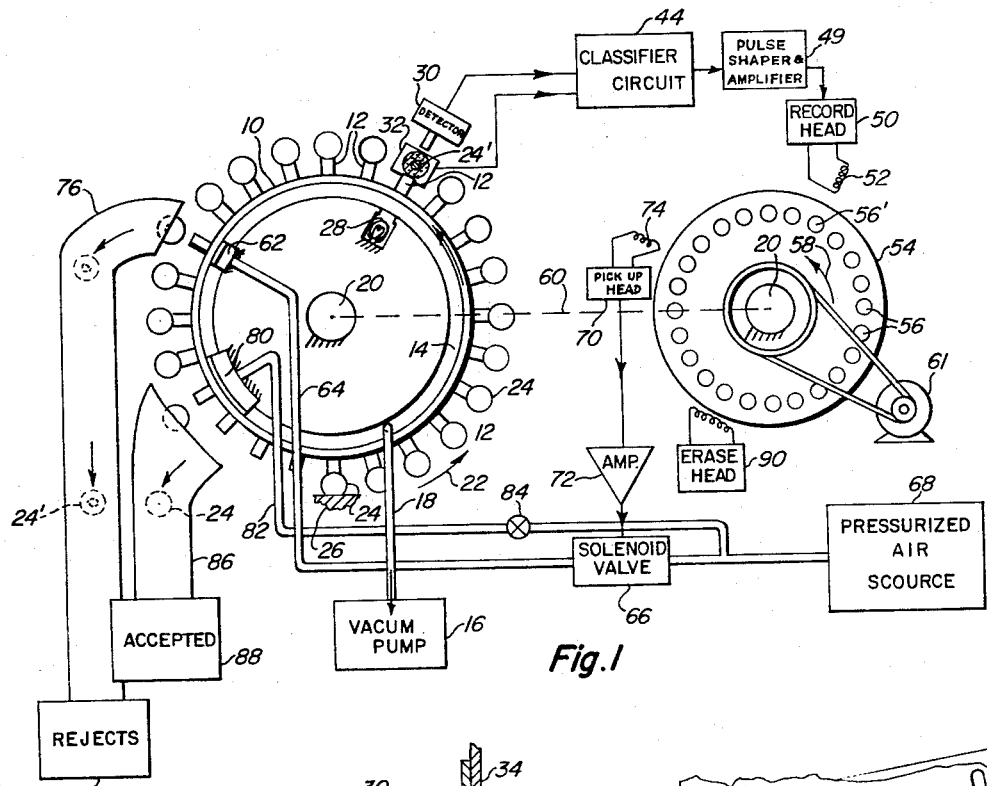
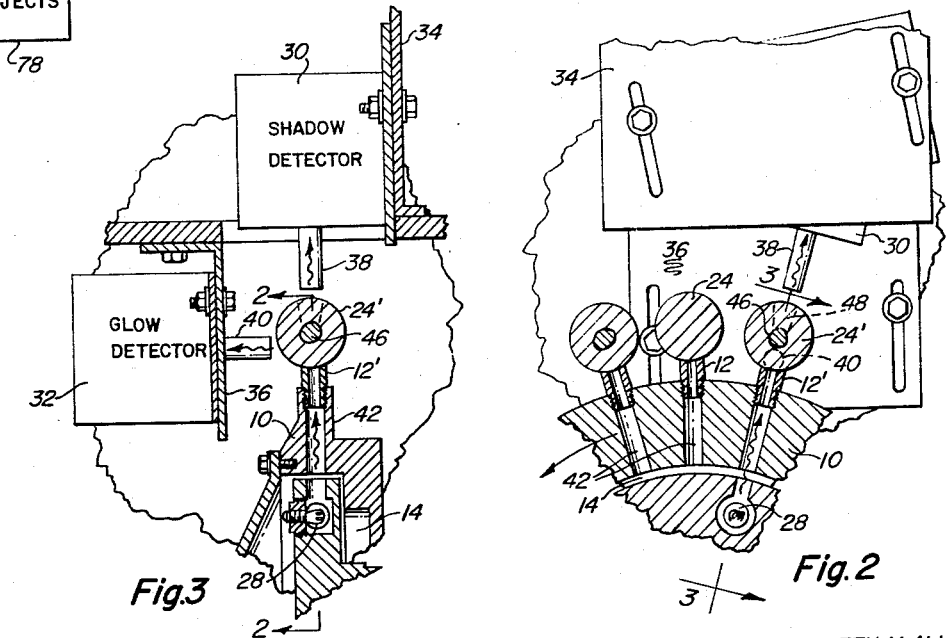
KENNETH M. ALLEN
LYLE H. VAN DYKE, JR.
REX L. BREUNSBACH
INVENTORS.
BY
BUCKHORN, BLORE, KLARQUIST & SPARKMAN
ATTORNEYS Sept. 27, 1966 K. M. ALLEN ETAL 3,275,136
APPARATUS FOR DETECTING SEEDS IN FRUIT
Filed Oct. 9, 1964 2 Sheets-Sheet 2
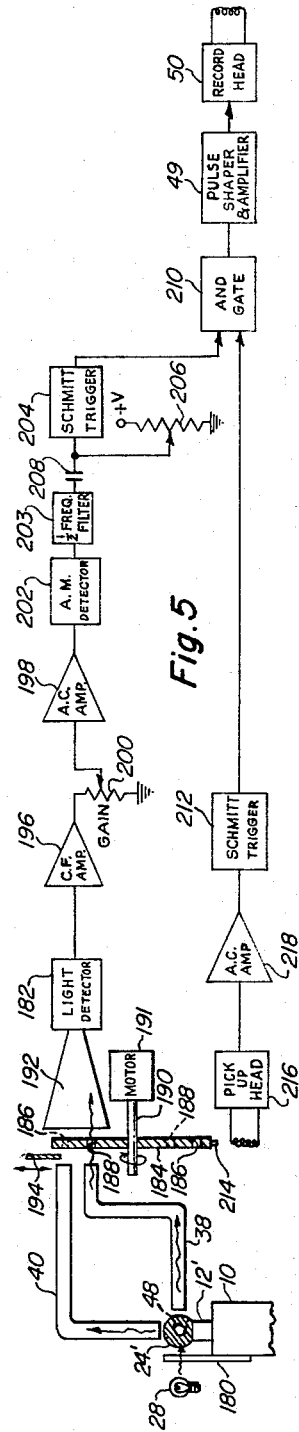
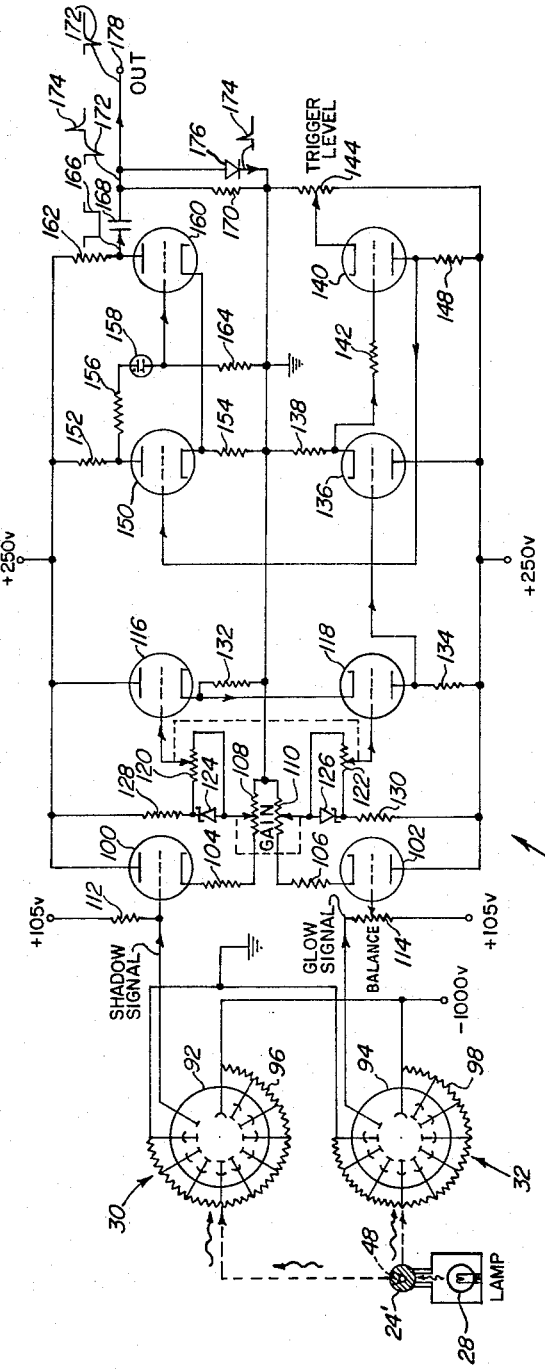
KENNETH M. ALLEN
LYLE H. VAN DYKE, JR.
REX L. BREUNSBACH
INVENTORS.
BY
BUCKHORN, BLORE, KLARQUIST & SPARKMAN
ATTORNEYS

United States Patent Office 3,275,136
Patented Sept. 27, 1966

1

3,275,136
APPARATUS FOR DETECTING SEEDS IN FRUIT
Kenneth M. Allen, Newberg, and Lyle H. Van Dyke, Jr., and Rex L. Breunsbach, Portland, Oreg., assignors to Allen Fruit Co., Inc., Newberg, Oreg., a corporation of Oregon
Filed Oct. 9, 1964, Ser. No. 402,818
10 Claims. (Cl. 209—74)

The subject matter of the present invention relates generally to apparatus for detecting foreign objects by means of radiant energy, and in particular to apparatus for automatically detecting any pits or seeds remaining in fruit after such fruit has been transmitted through a pit removal machine.

The detector apparatus of the present invention is especially useful when employed to determine whether the pits have been removed from cherries, but may also be used for detecting seeds in other types of fruit such as olives. Previously, the detection of cherry pits has been done manually by transmitting light of high intensity through the cherries and visually observing whether a pit exists in such cherry. Attempts to automatically detect cherry pits have been heretofore unsuccessful because of changes in the light transmission characteristics of the skin or meat of the cherries, variations in size of the cherries, and the different amounts of water or preservative liquid contained within or upon the cherries.

The detector apparatus of the present invention has several advantages over previous detector apparatus including an automatic operation which sorts the fruit as a much faster rate than by techniques previously employed. In addition, the detector apparatus of the present invention accurately detects the seeds or pits in cherries or other fruit in a more reliable manner regardless of discolorations of the skin or meat of such fruit and regardless of variations in the size of the fruit. Also, the operation of the present detector apparatus is not affected by variations of liquid content within or on the exterior surface of the fruit or any other factor which causes the light transmission characteristics of the fruit to vary between individual pieces.

Briefly, one embodiment of the detector apparatus of the present invention includes a vacuum pickup wheel having a plurality of ferrules uniformly spaced about the periphery of the wheel for transporting the cherries individually past a light source which may be located within the wheel to project light radially outward through one of such cherries. A pair of light detectors are positioned outside the wheel adjacent the test position of the cherry with one of such detectors spaced radially outward from such wheel and in alignment with the light source and cherry, and the other detector spaced from the side of the wheel in alignment with the cherry but out of alignment with the light source and any pit shadow produced by such source. The amplitude of the electrical signal produced by the first detector in alignment with the light source varies depending upon whether or not a pit is present in the cherry. However, the amplitude of the electrical signal produced by the second detector out of alignment with the light source remains substantially constant regardless of whether a pit is present in the cherry. The second detector provides a reference or standard signal which is compared with the test signal from the first detector in a differential amplifier to determine whether a pit is present. Since the light received by both detectors is emitted from a common source and transmitted through the same cherry, variations in the color or other light transmission characteristics of the skin or meat between successive cherries which change the amplitude of the test signal do not affect the accuracy of operation of the apparatus due to the fact that the amplitude of the reference signal also varies with these light transmission characteristics. In other words, each cherry is its own standard of comparison with regard to the light transmission characteristics of its skin and meat so that only the presence of a pit will produce a difference signal at the output of the differential amplifier of sufficient amplitude to actuate a reject mechanism which removes the cherry from the wheel.

It is, therefore, one object of the present invention to provide an improved apparatus for detecting foreign objects by means of radiant energy.

Another object of the present invention is to provide an improved apparatus of simple and inexpensive construction for automatically detecting the presence of seeds in fruit.

A further object of the invention is to provide an improved detector apparatus for automatically determining the presence of pits in cherries or other fruit in a fast and accurate manner.

An additional object of the present invention is to provide an improved cherry pit detector apparatus whose accuracy of operation is not affected by changes in the light transmission characteristics of the skin or meat of the cherries, variation in the size of the cherries or by changes in the amount of liquid contained within or upon such cherries.

Still another object of the present invention is to provide an improved apparatus for detecting the presence of pits or seeds in cherries or other fruit in which light is transmitted through the cherry to a first detector along a first path normally containing the shadow of the seed or pit, and such light is also transmitted through such cherry to a second detector along a second path out of alignment with the pit shadow so that the light transmitted to the first detector varies while the light transmitted to the second detector does not vary with the presence or absence of the pit.

Additional objects and advantages of the present invention will be apparent from the following detailed description of preferred embodiments thereof and from the attached drawings of which:

FIG. 1 is a diagrammatic view of one embodiment of the detector apparatus of the present invention;

FIG. 2 is an enlarged view of a portion of the apparatus of FIG. 1 with parts broken away for clarity;

FIG. 3 is a partial sectional view taken along line 3—3 of FIG. 2;

FIG. 4 is a schematic diagram of one embodiment of the classifier circuit employing the apparatus of FIG. 1; and FIG. 5 is a diagrammatic view of another embodiment of the detector apparatus.

As shown in FIG. 1, one embodiment of the detector apparatus of the present invention includes vacuum conveyor wheel 10 having a plurality of short tubes or ferrules 12 extending radially outward from the periphery of such wheel and uniformly spaced about the circumference thereof. Each of the ferrules 12 communicates with a vacuum chamber 14 inside such wheel which is connected to a vacuum pump 16 by tubing 18 so that the pressure within the vacuum chamber 14 is less than the atmospheric pressure outside of the conveyor wheel. The conveyor wheel is rotated about a fixed shaft 20 in the counterclockwise direction of arrow 22 and the ferrules 12 are moved successively into a loading position to pick up a single cherry 24 or other fruit out of a rotating bowl, vibrating conveyor or other supply of cherries indicated generally by reference number 26.

The cherries are held on the ends of the ferrules 12 by the vacuum pressure within chamber 14 and carried by the conveyor wheel 10 into a test position in alignment with a fixed source 28 of visible light, ultra violet or other suitable radiation. The light source 28 is positioned inside the conveyor wheel 10 within a housing supported on the fixed shaft 20. A pair of suitable light detectors 30 and 32, such as photomultiplier tubes, are supported outside the conveyor wheel adjacent the test position of the cherries. Detector 30 is spaced radially outward from the conveyor wheel in alignment with the light source and the top of the cherry under test 24', while detector 32 is spaced laterally from the side of the conveyor wheel in alignment with the lower portion of one side of the cherry but out of alignment with such light source to detect the glow at the bottom of such cherry, as shown in FIGS. 2 and 3. Each of the light detectors 30 and 32 is adjustably mounted on a bracket 34 and 36, respectively, and is provided with a light guide 38 and 40, respectively, between the detectors and the cherry under test. The light guides 38 and 40 may be in the form of cylindrical rods of methyl methacrylate plastic, quartz or flexible glass fibers in order to more efficiently couple the light emitted by the cherry through the detectors associated with such light guides. It should be noted that when flexible or curved light guides are employed, the detectors may be moved to any convenient position and need not be in alignment with the cherry 24' or light source 28. The detectors 30 and 32 are adjusted to position the outer ends of the light guide rods 38 and 40 as closely adjacent the cherry as possible while allowing for variations of size in cherries. The conveyor wheel 10 is provided with a plurality of radial passageways 42 extending through the wheel wall into which one end of each of the ferrules 12 is threaded to enable air to be sucked through such ferrules into the vacuum chamber 14 by vacuum pump 16 and to enable the light emitted by source 28 to be transmitted out of the wheel through one of the ferrules at a time. The ferrules prevent any light from being reflected from the surface of the cherries into the "glow" detector 32 which might give an incorrect reference signal. Of course, it is also possible to mount the light source outside of the conveyor wheel and to position the "glow" detector 32 inside such wheel to prevent any light reflections from reaching such detector.

When the cherry being tested does not contain a pit, the output signals of detectors 30 and 32 applied to the inputs of a classifier circuit 44, described in greater detail in FIG. 4, are not sufficiently different in magnitude to cause an output signal to be transmitted from such classifier circuit. However, when an unpitted cherry 24' is located in the test position, the amount of light transmitted to detector 30 is substantially less due to the fact that the pit 46 in such cherry casts a shadow 48 within the cherry to the top of such cherry which reduces the amount of light entering light guide rod 38. It should be noted that a certain amount of diffused or scattered light is emitted from the cherry in all directions so that the pit shadow 48 does not prevent all light from being received by the shadow detector 30. Since the glow detector 32 is positioned with its light guide 40 out of alignment with the pit shadow 48, the amount of light transmitted to such glow detector is substantially the same of a given cherry regardless of whether the cherry contains a pit or not. Thus, while the amount of light transmitted to the glow detector 32 through the cherry 24 does vary with the light transmission characteristics of the meat and skin of such cherry, it does not vary with the presence or absence of a pit in the cherry. As a result, the difference in amplitude between the output signals of detectors 30 and 32 is greater when the test cherry contains a pit. The classifier circuit 44 is adjusted so that the difference in amplitude of the signals produced by the two detectors for an unpitted cherry is sufficiently great to cause the classifier circuit 44 to produce an output signal which is transmitted through a pulse shaper and amplifier circuit 49 to a magnetic recording head 50 to produce a current in the recording coil 52 of such head.

The recording head 50 is positioned adjacent a storage wheel 54 of nonmagnetic material having a plurality of slugs 56 of magnetic material secured to one side of such storage wheel and uniformly spaced about the periphery of such wheel. Storage wheel 54 is rotated in a counterclockwise direction indicated by arrow 58 about the same fixed shaft 20 as the conveyor wheel 10 by a constant speed electrical motor 61, and the storage wheel is mechanically coupled to such conveyor wheel as indicated by dash line 60 so that the storage and conveyor wheels rotate at the same speed. The number of the magnetic slugs 56 provided on the storage wheel 54 is equal to the number of ferrules 12 provided on conveyor wheel 10. Also, the recording coil is mounted at the same angular position as the light source 28 and is located adjacent magnetic slug 56' corresponding to the ferrule 12' located in the test position to magnetize such slug and indicate that the cherry 24' contains a pit.

As the conveyor wheel 10 continues rotation in a counterclockwise direction, the ferrules 56 on the conveyor wheel are successively brought into alignment with an ejector nozzle 62 supported inside such wheel. The ejector nozzle 62 is connected by means of tubing 64 through a normally closed solenoid valve 66 to a pump or other source of pressurized air 68. The winding of the solenoid valve 66 is connected to the output of a magnetic pickup head 70 through an amplifier 72. The coil 74 of the pickup head is positioned adjacent the recording wheel 54 at a location which is annularly displaced the same amount from the recording coil 52 as the ejection nozzle 62 is displaced from the light source 28. Thus, when the magnetized slug 56' passes beneath the pickup coil 74, an output signal is transmitted from the pickup head to the solenoid valve 66 to open such valve and cause a pulse of air to be transmitted through the nozzle 62 and the ferrule 12' holding the unpitted cherry 24'. The air pulse overcomes the vacuum in ferrule 12' and forces such cherry outward away from the conveyor wheel 10 and into a discharge chute 76 which empties into a reject hopper or bin 78.

The cherries containing no pits are not removed from the conveyor wheel by ejector nozzle 62, but are rotated into a discharge position adjacent a larger ejector nozzle 80 which is connected by tubing 82 to air source 68 through a manually adjustable valve 84. The valve 84 is set to a partially open position to maintain a constant flow of air through the ejector nozzle 80 at much lower pressure than the air pulses transmitted through ejector nozzle 62 but sufficient to release the vaccum and cause the cherries to fall by gravity from the ferrules 12 into a discharge chute 86 which empties into a bin or hopper 88 holding the accepted cherries containing no pits.

It is possible that a dark spot on the skin of the cherry could be positioned on a ferrule in alignment with a passageway 42 in the conveyor wheel so that such spot can be mistaken for a pit by the classifier circuit thereby causing the rejection of such cherry erroneously. This can be corrected by recirculating the rejected cherries having spots thereon through the detector apparatus by transporting them back to the supply 26 automatically or by hand. Since the chances of the dark spot lining up with the passageway 42 a second consecutive time are extremely low, such dark spot will probably not be mistaken again for a pit. Of course, the number of times the spotted cherries are recirculated decreases the possibility of this mistake occurring. It should be noted that the magnetic slugs 56 on the storage wheel 54 are demagnetized after they pass the pickup head coil 78 by positioning an erase head 90 adjacent such recording wheel connected to a source of alternating current of constant frequency in a known manner.

One embodiment of the classifier circuit 44 of FIG. 1 is shown in FIG. 4 and includes a pair of photomultiplier tubes 92 and 94 for the shadow detector 30 and the glow detector 32, respectively. The photocathode of tubes 92 and 94 are connected to a negative D.C. voltage source of −1,000 volts and positioned to receive the light transmitted to the detectors through light guides 38 and 40, respectively, of FIG. 3. Each of the photomultiplier tubes 92 and 94 are provided with a resistance voltage divider 96 and 98, respectively, whose end terminals are connected between the −1,000 volt source and ground and whose taps are connected to the dynodes of the various stages of such tubes to provide accelerating voltages between such dynodes sufficient to cause secondary electron multiplication. The anodes of the photomultiplier tubes 92 and 94 are connected to the grids of triode vacuum tubes 100 and 102, respectively, each of type 12AT7 whose anodes are connected to positive D.C. voltage sources of +250 volts and whose cathodes are connected to ground through fixed load resistors 104 and 106, respectively, of 22 kilohms each and potentiometers 108 and 110, respectively, of 25 kilohms each so that such tubes are employed as cathode follower amplifiers. The grid of tube 100 is connected to a positive D.C. voltage source of +105 volts through a bias resistor 112 of 1 megohm while the grid of tube 102 is connected to the movable contact of a potentiometer 114 of 200 kilohms whose end terminals are connected between a D.C. voltage source of +105 volts and the anode of photomultiplier tube 94. The setting of the movable contact of potentiometer 114 balances the output signals of the cathode follower tubes 100 and 102 transmitted from the movable contacts of potentiometers 108 and 110 when the cherry being tested contains no pit. This is necessary because the amount of light transmitted to detector 32 is slightly greater than that transmitted to detector 30 in this condition due to the brighter glow at the bottom of the cherry.

The two output signals of the cathode follower tubes 100 and 102 are transmitted to the inputs of a differential amplifier formed by vacuum tubes 116 and 118 which produces a single difference signal output when there is any difference in the voltage amplitudes of such two signals. The grids of tubes 116 and 118 are connected to the movable contacts of potentiometers 120 and 122, respectively, of 50 kilohms each whose end terminals are connected across Zener diodes 124 and 126, respectively. The anodes of the Zener diodes are connected to the movable contacts of potentiometers 108 and 110, respectively, and the cathodes of such diodes are connected to the D.C. voltage sources of +250 volts through resistors 128 and 130 of 220 kilohms each. The Zener diodes 124 and 126 provide a constant voltage drop 8.2 volts across the potentiometers 120 and 122 to insure that the grids of tubes 116 and 118 are varied through the same range when the movable contacts of potentiometers 120 and 122 are moved, regardless of the settings of potentiometers 108 and 110. The movable contacts of potentiometers 108 and 110 are ganged to vary the gain of cathode follower tubes 100 and 102 the same amount. In addition, the movable contacts of potentiometers 120 and 122 are also ganged to vary the bias voltage of tubes 116 and 118 but in the opposite direction to act as a differential balance for the differential amplifier so that an increase in grid bias voltage on tube 118 results in a decrease in grid bias voltage on the tube of 116.

The cathodes of tubes 116 and 118 are connected to ground through a resistor 132 of 22 kilohms, and the anode of tube 116 is connected to a source of positive D.C. supply voltage of +250 volts while the anode of tube 118 is connected to a source of similar supply voltage through a load resistor 134 of 1 megohm. Thus, the tube 118 serves as a comparator and produces a difference signal output on the anode of such tube when the input signals applied to the cathode and grid of the tube are unequal. The shadow signal transmitted from the anode of photomultiplier 92 is applied to the cathode of tube 118 with no phase reversal, while the glow signal transmitted from the anode of photomultiplier 94 is also transmitted to the grid of tube 118 with no phase reversal. When the cherry 24′ contains a pit, the amount of light transmitted to photomultiplier 92 decreases so that the shadow signal current reduces in resistor 112 to produce a more positive signal voltage on the grid of tube 100. This causes the voltage on the grid of tube 116 and the cathode of tube 118 to increase to a more positive value to produce a positive going difference signal on the anode of tube 118.

This positive difference signal is applied to the grid of a cathode follower tube 136 whose cathode is connected to ground through a load resistor 138 of 22 kilohms and to the grid of an inverter amplifier tube 40 through a coupling resistor of 390 kilohms. The cathode of the amplifier tube 140 is connected to the movable contact of a potentiometer 144 of 50 kilohms whose end terminals are connected between a D.C. voltage of +250 volts and ground. A negative difference signal is produced across a load resistor 148 of 470 kilohms which is connected between the anode of tube 140 and the +250 volt source.

The negative difference signal is transmitted to a Schmitt trigger type bistable multivibrator including a vacuum tube 150 whose grid is connected to the anode of tube 140. The tube 150 is normally biased conducting by the voltage drop across resistor 148 produced by the current flowing through tube 140 which is controlled by the setting of potentiometer 144 that determines the trigger voltage level of the Schmitt trigger circuit. The anode of tube 150 is connected through a load resistor 152 of 12 kilohms to the +250 volt source and its cathode is connected to ground through a bias resistor 154 of 27 kilohms. The anode of tube 150 is connected through a resistor 156 of 100 kilohms and a voltage regulator gas diode 156, such as a neon tube, to the grid of an output tube 160 whose cathode is connected to the cathode of tube 150 and whose anode is connected to the +250 source through a load resistor 162 of 12 kilohms. The voltage regulator tube 158 provides a substantially constant voltage drop of about 75 volts between the resistor 156 and the grid of tube 160 to set the output voltage at the anode of tube 160 at the proper value. The bias voltage applied to the grid of tube 160 is produced across a bias resistor 164 of 270 kilohms connected between the voltage regulator tube 158 and ground to provide a voltage divider network with resistor 156 and such voltage regulator tube, and such bias voltage quiescently biases the output tube 160 nonconducting.

When the negative difference signal exceeds the trigger level of the Schmitt trigger circuit, tube 150 is rendered nonconducting and tube 160 conducting to produce a negative going pulse 166 on the anode of tube 160. When the difference signal ceases, the Schmitt trigger circuit is reverted to its initial stable state to render tube 150 again conducting and tube 160 again nonconducting, and causes the pulse 166 to cease thereby producing the rectangular wave form of such pulse. This neagtive rectangular pulse is transmitted through a differentiating network including a coupling capacitor 168 of .01 microfarad and a shunt resistor 170 of 330 kilohms connected between the output terminal of such capacitor and ground, to produce negative and positive voltage spikes 172 and 174 corresponding to the leading and trailing edges, respectively, of the pulse 166. A clipping diode 176 is connected across shunt resistor 170 of the proper polarity to transmit the positive spike 174 to ground and to allow the negative spike 172 to be transmitted to the output terminal 178 of the classifier circuit. The output terminal of such classifier circuit is connected to the pulse shaper and amplifier circuit 49 of FIG. 1 which may include a "one shot" multivibrator that produces an output pulse corresponding to the negative spike pulse 172 and transmits such output pulse to the recording coil 52 to magnetize the slug 56′.

Another embodiment of the detection apparatus of the present invention is shown in FIG. 5. This embodiment is similar to that of FIGS. 1 to 3 so that only the differences between these apparatuses is shown and described. Thus, while the light source 28 may be positioned inside the conveyor wheel 10, as in FIG. 1, such light source is shown positioned outside the conveyor wheel and a plurality of light shielding vanes 180 are attached to the conveyor wheel between the ferrules to prevent the light of such source from striking the light guides 38 and 40 during this time. A single light detector 182 is employed in place of the two detectors 30 and 32, and a light chopper wheel 184 is positioned between the light detector and the output ends of the light guides 38 and 40. The chopper wheel is provided with two groups 186 and 188 of uniformly spaced apertures arranged in annular concentric groups about the shaft 190 of such wheel in which the apertures of the two groups are arranged alternately in different radial positions to alternately transmit light through the chopper from light guides 38 and 40 to detector 182 several times for each cherry by rotating the chopper wheel with a motor 191. In order to concentrate both light beams onto the same portion of the detector 182, a frustoconical light guide 192 may be supported between the chopper wheel and such detector with its larger input end covering the output ends of both light guides 38 and 40. Also, an adjustable light shutter member 194 or polarizing filters can be provided between the output end of light guide 40 and the chopper wheel to balance the intensities of the two beams of light transmitted to the detector when the cherry contains no pit.

The chopper produces an alternating current signal having a frequency of about 1,200 cycles per second at the output of the light detector which is amplitude modulated by variations in the intensity of the two light beams transmitted through such chopper. This signal is transmitted through a cathode follower amplifier 196 and an A.C. voltage amplifier 198, whose total gain is determined by the setting of a potentiometer 200, to an amplitude modulation detector 202. The demodulated output signal of A.M. detector 202 is transmitted through a one-half frequency filter 203 having a band pass of about 600 c.p.s. to a Schmitt trigger circuit 204. The trigger level of the Schmitt circuit is varied by the setting of a variable contact on a potentiometer 206 connected to the output of a coupling capacitor 208 between the filter and the Schmitt circuit so that such Schmitt circuit is triggered only by a demodulated and filtered signal of large amplitude which is produced when unpitted cherries are tested. The negative rectangular output pulse 166 of the Schmitt trigger circuit 204 is transmitted to one input of an And-gate 210 whose other input is connected to the output of a second Schmitt trigger circuit 212. The second Schmitt circuit is triggered only when a shadow signal is transmitted through holes 188 in the chopper wheel 184 by providing a plurality of permanent magnets 214 at positions on the chopper wheel corresponding to such holes so that such magnets move past the coil of a pick-up head 216 to produce a trigger pulse at that time. The output of the magnetic pick-up 216 is connected to the Schmitt circuit 212 through an A.C. amplifier 218. Thus, the And-gate 210 is only rendered conducting when output signals are produced by both Schmitt circuits 204 and 212, which only happens when a sahdow signal is generated and is of sufficient amplitude to indicate the presence of a pit in the cherry. The output signal of the And-gate is transmitted to the record head 50 through the pulse shaper 49 in a similar manner to the circuit of FIG. 4. It should be noted that light detector 182 of FIG. 5 may be a photocell or some other photosensitive device which does not use a high voltage power supply as is required for the photomultiplier tubes, because the A.C. output signal of the detector 182 can be amplified externally of the detector by A.C. amplifier 198 much more easily than the D.C. output signals of detectors 30 and 32 because of the thermal drift, etc., of D.C. amplifiers.

It will be obvious to those having ordinary skill in the art that many changes may be made in the details of the above-described preferred embodiments of the present invention without departing from the spirit of the invention. For example, it is possible to add an integrating circuit between the output of the differential amplifier including tubes 116 and 118 and the input of the amplifier tube 140 in order to more clearly distinguish between pit shadow signals and spot signals to prevent mistaken rejection of a cherry containing such spot or blemish. Therefore, the scope of the present invention should only be determined by the following claims.

We claim:
1. Apparatus for detecting seeds in fruit comprising:
a source of light;
means for positioning the fruits adjacent said source to cause the light emitted therefrom to be transmitted through one fruit;
detector means positioned in two different light paths in common with said one fruit to receive the light transmitted from said one fruit in two different directions and to produce an electrical signal whose amplitude depends upon the amount of light received by said detector means which decreases in one of said paths when the fruit contains a seed; and
classifier means connected to said detector means, for producing an output signal when the change in amplitude of the detector output signal is sufficiently great to indicate the presence of a seed in said one fruit.

2. Apparatus for detecting seeds in fruit comprising:
a source of light;
transport means for transporting the fruit past said source to project the light through at least one fruit at a time;
detector means positioned in two different light paths in common with said one fruit to detect the light transmitted from said one fruit in two different directions and to produce an electrical signal whose amplitude depends upon the amount of light received by said detector means which decreases in only one of said paths when the fruit contains a seed, because said one path passes through the shadow of said seed;
classifier means connected to said detector means, for producing an output signal when the amplitude of the detector output signal is sufficiently low to indicate the presence of a seed in said one fruit; and
rejection means connected to said classifier means for ejecting said one fruit from said transport means in response to said output signal.

3. Apparatus for detecting seeds in fruit comprising:
a source of light;
means for supporting the fruit adjacent said source to enable the light emitted from said source to be transmitted through one fruit;
first detector means positioned in a first light path in common with said one fruit to detect the light transmitted from said one fruit in a first direction and along said first path, and to produce a first electrical signal whose amplitude depends upon the amount of light received by said first detector means which decreases when the fruit contains a seed;
second detector means positioned in a second light path in common with said one fruit to receive the light transmitted from said one fruit in a different direction than said first direction along said second path, and to produce a second electrical signal whose amplitude remains substantially constant for said one fruit regardless of whether it contains a seed, but whose amplitude can vary from fruit to fruit depending upon their light transmission characteristics so that said second signal serves as a standard reference signal for each fruit; and classifier means connected to the first and second detector means, for receiving said first and second signals and producing an output signal when the difference in amplitude between said first and second signals is sufficiently great to indicate the presence of a seed in said one fruit.

4. Apparatus for detecting pits in cherries comprising:
a source of light;
conveyor means for transporting the cherries past said source individually to project the light through one cherry at a time and produce a shadow of any pit in said one cherry;
first detector means positioned in a first light path in common with said one cherry to detect the light transmitted from said one cherry along said first path and to produce a first electrical signal whose amplitude depends upon the amount of light received by said first detector means, said first light path being in the shadow of the pit so that the light transmitted along said first path decreases when said one cherry contains a pit;
second detector means positioned in a second light path in common with said one cherry to receive the light transmitted from said one cherry along said second path and to produce a second electrical signal, said second light path being out of the shadow of the pit so that the amplitude of the second signal remains substantially constant for said one cherry regardless of whether it contains a pit, but whose amplitude can vary from cherry to cherry depending upon their light transmission characteristics so that said second signal serves as a standard reference signal for each cherry;
classifier means connected to the first and second detector means, for receiving said first and second signals and producing an output signal when the difference in amplitude between said first and second signals is sufficiently great to indicate the presence of a pit in said one cherry; and
rejection means connected to said classifier means for ejecting said one cherry from said conveyor means in response to said output signal.

5. Apparatus for detecting seeds in fruit comprising:
a conveyor wheel having a plurality of hollow tubes extending outwardly from and uniformly spaced about the periphery of said wheel in communication with the interior of a chamber inside said wheel;
loading means for transporting fruit to a loading position adjacent said wheel and for creating a vacuum pressure in said chamber to pick up and hold a fruit on the end of each of said tubes at said loading position;
drive means for rotating said wheel;
a light source fixedly supported at a test position adjacent said wheel to transmit light through at least one fruit on one of said tubes at a time when said one tube is rotated into said test position; and
light detector means supported adjacent said wheel at said test position in two different light paths in common with said one fruit on said one tube to receive the light transmitted from said one fruit in two different directions, and to produce an electrical signal whose amplitude depends upon the amount of light received by said detector means which decreases in one of said two paths when said one fruit contains a seed.

6. A cherry pit detector comprising:
a conveyor wheel having a plurality of hollow tubes extending outwardly from and uniformly spaced about the periphery of said wheel in communication with the interior of the chamber inside said wheel;
loading means for transporting cherries to a loading position adjacent said wheel and for creating a vacuum pressure in said chamber to pick up and hold a cherry on the end of each of said tubes at said loading positon;
drive means for rotating said wheel;
a light source fixedly supported inside said wheel at a test position to transmit light through at least one of said tubes and the cherry on said one tube at a time when said one tube is rotated into said test position;
light detector means supported outside of said wheel adjacent said test position in two different light paths in common with said light source and said one cherry on said one tube to receive the light transmitted from different portions of said one cherry, and to produce an electrical signal whose amplitude depends upon the amount of light received by said detector means which decreases in one of said two paths when said one cherry contains a pit;
ejection means actuated by said detector means, for overcoming the vacuum pressure in a predetermined tube on said wheel at a reject position to remove the cherry from said predetermined tube at said reject position after passing said test position when such cherry contains a pit; and
unloading means for overcoming the vacuum pressure in the tubes to discharge the pitless cherries at an unloading position after said tubes pass said reject position and before said tubes reach said loading position.

7. A cherry pit detector comprising:
a conveyor wheel having a plurality of hollow tubes extending radially outward from and uniformly spaced about the periphery of said wheel in communication with the interior of the chamber inside said wheel;
vacuum means for picking up and holding a cherry on the end of each of said tubes at a loading position by creating a vacuum pressure in said chamber;
drive means for rotating said wheel;
a light source fixedly supported inside said wheel at a test position to transmit light through at least one of said tubes and the one cherry on said one tube at a time when said one tube is rotated to a test position to produce a shadow of any pit contained in said one cherry;
a pair of light detectors supported outside of said wheel adjacent said test position, one of said detectors being positioned in a first light path in common with said one cherry on said one tube to detect the light transmitted from one portion of said one cherry in the shadow of the pit of said one cherry when said one cherry contains a pit, and the other detector being positioned in a second light path in common with said one cherry on said one tube to receive the light transmitted from another portion of said one cherry out of the pit shadow;
ejection means actuated by said detectors for overcoming the vacuum pressure in a predetermined tube on said wheel at a reject position to remove the cherry from said predetermined tube at said reject position after passing said test position when such cherry contains a pit.

8. A cherry pit detector comprising:
a conveyor wheel having a plurality of hollow tubes extending radially outward from and uniformly spaced about the periphery of said wheel in communication with the interior of the chamber inside said wheel;
vacuum means for picking up and holding a cherry on the end of each of said tubes at a loading position by creating a vacuum pressure in said chamber;
drive means for rotating said wheel;
a light source fixedly supported inside said wheel at a test position to transmit light through at least one of said tubes and the cherry on said one tube at a time when said one tube is rotated to a test position;
a pair of light detectors supported outside of said wheel adjacent said test position, one of said detectors being positioned in a first light path in common with said one cherry on said one tube to detect the light transmitted from said one cherry in a first direction, and the other detector being positioned in a second light path in common with said one cherry on said one tube to receive the light transmitted from said one cherry in another direction different from said first direction;
a pair of light guide members each positioned between a different one of said detectors and the test position of said one cherry on one tube;
ejection means for overcoming the vacuum pressure in a predetermined tube on said wheel at a reject position to remove the cherry from said predetermined tube at said reject position after passing said test position when such cherry contains a pit; and
unloading means for overcoming the vacuum pressure in the tubes to discharge the pitless cherries at an unloading position after said tubes pass said reject position and before said tubes reach said loading position.

9. Apparatus for detecting seeds in fruit comprising:
a source of light;
means for positioning the fruits adjacent said source to cause the light emitted therefrom to be transmitted through one fruit;
a single detector means positioned in two different light paths in common with said one fruit to receive the light transmitted from said one fruit to two different directions and to produce an electrical signal whose amplitude depends upon the amount of light received by said detector means which decreases in one of said paths when the fruit contains a seed;
chopper means for alternately blocking said two light paths to prevent the light in one path from reaching said detector means while enabling the light in the other path to reach said detector means to transmit an alternating current output signal from said detector means which is amplitude modulated by the variations in intensity of said light;
classifier means connected to said detector means, including an amplitude modulation detector, for demodulating the output signal of the detector means and for producing an output signal when the change in amplitude of the demodulated signal is sufficiently great to indicate the presence of a seed in said one fruit.

10. A cherry pit detector comprising:
a conveyor wheel having a plurality of hollow tubes extending outwardly from and uniformly spaced about the periphery of said wheel in communication with the interior of the chamber inside said wheel;
loading means for transporting cherries to a loading position adjacent said wheel and for creating a vacuum pressure in said chamber to pick up and hold a cherry on the end of each of said tubes at said loading position;
drive means for rotating said wheel;
a light source fixedly supported inside said wheel at a test position to transmit light through at least one of said tubes and the cherry on said one tube at a time when said one tube is rotated into said test position;
a single light detector means supported outside of said wheel adjacent said test position in two different light paths in common with said light source and said one cherry on said one tube to receive the light transmitted from different portions of said one cherry, and to produce an electrical signal whose amplitude depends upon the amount of light received by said detector means which decreases in one of said two paths when said one cherry contains a pit;
chopper means for alternately blocking said two light paths to prevent the light in one path from reaching said detector means while enabling the light in the other path to reach said detector means to transmit an alternating current output signal from said detector means which is amplitude modulated by the variations in intensity of said light;
ejection means actuated by said detector means, for overcoming the vacuum pressure in a predetermined tube on said wheel at a reject position to remove the cherry from said predetermined tube at said reject position after passing said test position when such cherry contains a pit; and
unloading means for overcoming the vacuum pressure in the tubes to discharge the pitless cherries at an unloading position after said tubes pass said reject position and before said tubes reach said loading position.

References Cited by the Examiner
UNITED STATES PATENTS

| | | | |
|---|---|---|---|
| 2,987,182 | 6/1961 | Ator et al. | 209—111.6 |
| 3,005,548 | 10/1961 | Flanders et al. | 209—111.6 |
| 3,005,550 | 10/1961 | Flanders et al. | 209—111.6 |
| 3,058,588 | 10/1962 | Palmquist | 209—111.7 |

M. HENSON WOOD, Jr., *Primary Examiner.*

A. N. KNOWLES, *Assistant Examiner.*